Feb. 17, 1970 D. W. MASTERS 3,496,548

MULTIPLE REGISTER DATA STORAGE

Filed July 29, 1960

INVENTORS
DAVID W. MASTERS
BY
ATTORNEY.

United States Patent Office 3,496,548
Patented Feb. 17, 1970

3,496,548

MULTIPLE REGISTER DATA STORAGE

David W. Masters, Phoenix, Ariz., assignor to General Electric Company, a corporation of New York Filed July 29, 1960, Ser. No. 53,024
Int. Cl. G11b *13/00*
U.S. Cl. 340—172.5 18 Claims

ABSTRACT OF THE DISCLOSURE

Apparatus for counting-down a number in two counters, wherein the number is first counted down in a large counter for accommodating the original size of the number, and wherein when the number has been counted down to a smaller value so that it can be inserted into a smaller counter it is automatically transferred to the smaller counter for further counting-down, freeing the larger counter.

Figure 1:
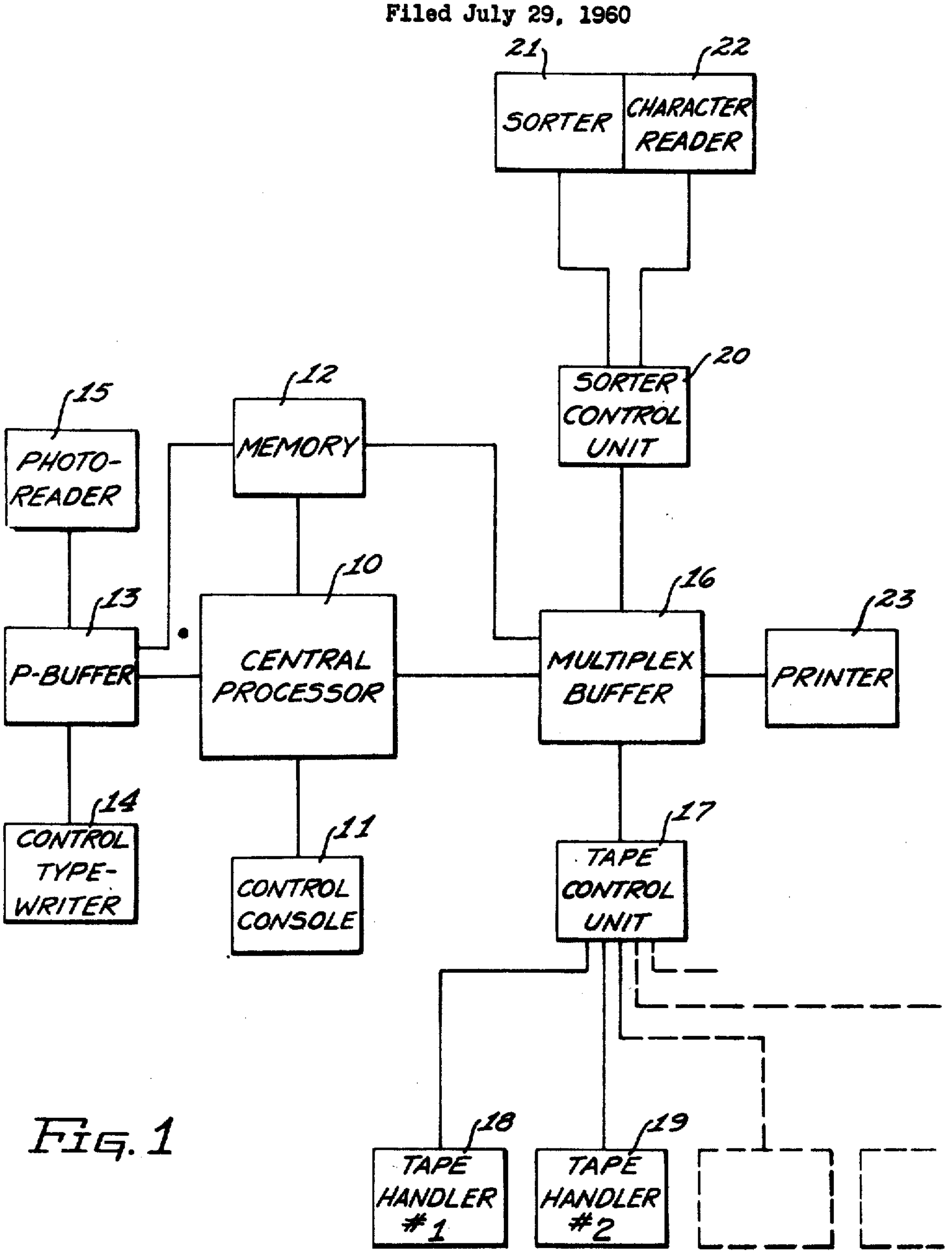

This invention relates to data processing systems and more particularly to apparatus for providing counting of data units representing numbers.

In data processing systems data units comprising a plurality of characters are processed. In those data units which represent numbers the characters thereof represent numeric digits. Each such numeric digit, in turn, is represented by a plurality of binary digits. These data units are processed by holding them temporarily in storage elements known as registers. The size of a register is determined by the length of data unit to be stored therein. Thus, when a register is to store a data unit representing a number, the register comprises a storage element for each binary digit comprising the number. In systems wherein data units of various lengths are employed registers of various lengths are provided. For purposes of economy, during data processing operations data units are held in the smallest possible registers to free the larger registers for the holding of larger data units.

One type of data processing operation frequently performed is that of counting. In the counting operation the number to be processed is held in a register while counting signals are generated at regular intervals. Each counting signal actuates apparatus which increases or decreases the number in the register by a predetermined amount. Decreasing the value of a large number, by such a counting operation, until it becomes a small number requires a relatively long period of time. During such period the processing of data may be unduly delayed because of the unavailability of the larger register holding the number being counted. Consequently, it is desirable to provide means to avoid delaying data processing operations when counting periods of long duration are necessary.

Therefore, it is an object of this invention to provide a novel data processing system to provide for the most rapid processing of data.

Another object of this invention is to provide apparatus for effecting the most economical employment of the registers of a data processing system.

Another object of this invention is to provide for the efficient employment of the registers of a data processing system by utilizing novel apparatus for performing counting operations on numbers held in the registers.

Another object of this invention is to provide more economical apparatus for performing counting operations on numbers by effecting a more efficient employment of the large registers of a data processing system.

Another object of this invention is to provide a novel counting apparatus.

The foregoing objects are achieved in a data processing system of the type described by employing novel counting apparatus which requires the use of the larger registers of the system only during those periods when the number being counted is too large to insert into a smaller register, and which automatically transfers the number being counted to a smaller register when entry of the number therein becomes possible. When the large number to be counted enters the large register a signal controls the starting of the counting operation. Responsive to this signal a succession of counting signals are generated. Each of these counting signals actuates apparatus to decrease the number in the large register by a predetermined amount. When the number has been counted to a smaller value so that it can be inserted into a smaller register a transfer means provides for transferring a representation of the value of the number remaining in the larger register to the smaller register. Counting signals then continue until the number in the small register has been reduced to a predetermined value. Thus, the larger register is freed for employment in further data processing operations.

The invention will be described with reference to the accompanying drawings, wherein:

FIGURE 1 is a block diagram of a data processing system to which the instant invention is applicable.

DATA PROCESSING SYSTEM—GENERAL

The Data Processing System of FIG. 1 is adapted to process data under operational control of a Central Processor 10. The lines interconnecting the various components illustrated in FIG. 1 represent symbolically paths of data and control communication.

The Central Processor responds to a plurality of distinct instructions, which are supplied thereto in the sequential order necessary to perform a particular data processing operation. A Control Console 11 provides an indicating and control station for the operator, whereby he has access to the system for modification of the order of execution of the instructions or for data revision. A Memory 12 stores data words which are to be processed, data words which are the results of processing, and instruction words. The Central Processor communicates with the Memory to receive therefrom data words on which operations are to be performed and instruction words. Following certain data processing operations, the Central Processor transmits the resulting data words to the Memory for storage.

A P-Buffer 13, controlled by the Central Processor, temporarily stores data words being transferred from a Control Typewriter 14 or a Photoreader 15 to Memory and data words being transferred from Memory to the Control Typewriter. The Control Typewriter receives data words from the P-Buffer and types a visible representation of these words or punches on paper tape an encoded representation of these words. The Control Typewriter also transfers data words to the P-Buffer by reading encoded punched paper tape or upon depression of Control Typewriter keys in proper sequence. The Photoreader photoelectrically reads punched encoded paper tapes and transfers the electrical representations of the data thereon to the P-Buffer.

A Multiplex Buffer 16, indirectly controlled by the Central Processor, temporarily stores data being transferred from magnetic tape or from magnetically imprinted documents to Memory and data being transferred from Memory for recording on magnetic tape or for imprinting in visible representation. A Tape Control Unit 17 directs one of a plurality of Tape Handlers 18, 19, etc., to read data from the respective magnetic tape thereof and to deliver this data to the Multiplex Buffer. The Tape Control Unit also directs one of the Tape Handlers to write data provided by the Multiplex Buffer on the respective magnetic tape thereof.

A Sorter Control Unit 20 controls the reading of data borne by documents, such as bank checks, and directs the sorting of these documents into pockets of a Sorter 21. A Character Reader 22 senses magnetically imprinted information on these documents and delivers an encoded representation of this data to the Multiplex Buffer. The Central Processor delivers to the Sorter Control Unit data representing the pockets of Sorter 21 in order that the documents handled thereby may be appropriately sorted in accordance with the information thereon.

A Printer 23 receives data words from the Multiplex Buffer and prints a visible representation of these words.

Thus, the system of FIG. 1 processes data received from magnetic tape, documents, the Control Typewriter, or the Photoreader and communicates the results of the data processing by providing a visible record, by permanently storing the results on magnetic tape, by punching paper tape, or by sorting documents.

For a complete description of the system of FIGURE 1 and of the instant invention which is embodied in such system, reference is made to U.S. Patent 3,077,984 issued to R. R. Johnson and assigned to the assignee of the present invention. More particularly, FIGURES 2–245 of the drawings; column 1, lines 8–73; column 2; column 3, lines 1–27; column 4, lines 55–75; columns 5 and 6; column 7, lines 1–16; column 8, lines 8–75; columns 9–258; and column 259, lines 1–35 of U.S. Patent 3,077,984 are incorporated herein by reference and made a part of the instant patent application.

What is claimed is:

1. In a data processing system, the combination comprising: first and second registers for storing data, means connected to said first register for inserting data representing a number in said first register, first means connected to said first register for providing successive alterations of the value of said number in said first register, transfer means connected to said first and second registers and responsive to a predetermined number of said alterations for transferring a representation of the number in said first register to said second register, and second means connected to said second register for providing successive alterations of the value of said number in said second register.

2. The combination of claim 1, further including means responsive to said number in said second register reaching a representation of a predetermined value for disabling operation of said second means.

3. The combination of claim 2, further including means responsive to said number in said first register reaching a representation of said predetermined value for disabling operation of said first means and said transfer means.

4. In a data processing system, the combination comprising: first and second registers for storing data, control means for providing a first signal to control the starting of an operation in said system, means connected to said first register for inserting data representing a number into said first register, means connected to said control means and to said first register and responsive to said first signal for providing a succession of second signals, each of said second signals altering the value of said number in said first register by a fixed amount, transfer means connected to said first and second registers and responsive a predetermined number of said second signals for transferring a representation of the number in said first register to said second register, and means connected to said second register and responsive to the transfer of the contents of said first register to said second register for providing a succession of third signals, each of said third signals altering the value of the number in said second register by a fixed amount.

5. The combination of claim 4, further including means responsive to the number in said first register reaching a representation of a predetermined value for providing a fourth signal, means responsive to the contents of the number in said second register reaching said representation of a predetermined value for providing a fifth signal, and means responsive to said fourth or said fifth signal to respectively terminate said second or third signals.

6. The combination of claim 5, further including means responsive to said number in said first register reaching said representation of a predetermined value for disabling operation of said transfer means.

7. In a data processing system, the combination comprising: first and second registers for storing data, means connected to said first register for inserting data representing a number in said first register, first means connected to said first register for providing successive alterations of the value of said number in said first register, transfer means connected to said first and second registers and responsive to a predetermined number of said alterations for transferring a representation of the complement of the number in said first register to said second register, and second means connected to said second register for providing successive alterations of the value of said number in said second register.

8. In a data processing system, the combination comprising: first and second registers for storing data, means connected to said first register for inserting data representing a number in said first register, first means connected to said first register for providing successive alterations of the value of said number in said first register, tranfer means connected to said first and second registers and responsive to a predetermined number of said alterations for transferring a representation of the complement of the number in said first register to said second register, and second means connected to said second register for providing successive alterations of the value of said number in said second register, the alterations provided by said second means causing the number in said second register to change in a sense opposite to the sense of the changes caused by the alterations on the number in said first register provided by said first means.

9. Apparatus as in claim 8, further including means responsive to the number in said first register reaching a representation of a predetermined value for disabling operation of said first means and said transfer means and means responsive to the number in said second register reaching a representation of another predetermined value for disabling operation of said second means.

10.In a data processing system, the combination comprising: first and second registers for storing data, control means for providing a first signal to control the starting of an operation in said system, means connected to said first register for inserting data representing a number into said first register, means connected to said control means and to said first register and responsive to said first signal for providing a succession of second signals, each of said second signals altering the value of said number in said first register by a fixed amount, transfer means connected to said first and second registers and responsive to a predetermined number of said second signals for transferring a representation of the complement of the number in said first register to said second register, and means connected to said second register and responsive to the transfer of the contents of said first register to said second register for providing a succession of third signals, each of said third signals altering the value of the number in said second register by a fixed amount, the alterations provided by said third signals causing the number in said second register to change in a sense opposite to the sense of the changes cause by the alterations on the number in said first register provided by said second signals.

11. The combination of claim 10, further including means responsive to the number in said first register reaching a representation of a predetermined value for providing a fourth signal, means responsive to the contents of the number in said second register reaching the representation of another predetermined value for providing a fifth signal, and means responsive to said fourth or fifth signals to respectively terminate said second and third signals.

12. The combination of claim 11 wherein each of said second signals decreases the value of the number in said first register by a fixed amount and wherein each of said third signals increases the value of the number in said second register by a fixed amount.

13. In a data processing system, the combination comprising: first and second registers for storing data, said first register having a predetermined storage capacity and said second register having a storage capacity which is less than that of said first register, means for inserting data representing a number in said first register, means for successively decreasing the size of said number in said first register, and transfer means responsive to the decrease in size of said number in said first register to within the storage capacity of said second register for transferring a representation of the number in said first register to said second register.

14. In a data processing system, the combination comprising: first and second registers for storing data, said first register having a predetermined storage capacity and said second register having a storage capacity which is less than that of said first register, means for inserting data representing a number in said first register, means for successively decreasing the size of said number in said first register, transfer means responsive to the decrease in size of said number in said first register to within the storage capacity of said second register for transferring a representation of the complement of the number in said first register to said second register, and means for successively increasing the value of the number in said second register until the number in said second register reaches a predetermined value.

15. In a data processing system, the combination comprising: first and second registers for storing data, said first register having a predetermined storage capacity and said second register having a storage capacity which is less than that of said first register, means for inserting data representing a number in said first register, means for succesisvely decreasing the size of said number in said first register, transfer means responsive to the decrease in size of said number in said first register to within the storage capacity of said second register for transferring a representation of the number in said first register to said second register, and means for successively altering the value of the number in said second register until the number in said second register reaches a predetermined value.

16. In a data processing system, the combination comprising: first and second registers for storing data, said first register having a predetermined storage capacity and said second register having a storage capacity which is less than that of said first register, means for providing a first signal to control the starting of an operation in said system, means for inserting data representating a number in said first register, means responsive to said first signal for providing a succession of second signals, each of said second signals successively decreasing the size of said number in said first register by a fixed amount, transfer means responsive to the decrease in size of said number in said first register to within the storage capacity of said second register for transferring a representation of the number in said first register to said second register, and means responsive to the transfer of the contents of said first register to said second register for providing a succession of third signals, each of said third signals altering the value of the number in said second register by a fixed amount.

17. In a data processing system, the combination comprising: first and second counters for storing representations of numbers, said first counter having a predetermined storage capacity and said second counter having a storage capacity which is less than that of said first counter, means for inserting data representing a number in said first counter, means for successively decreasing the size of said number in said first counter, and transfer means responsive to the decrease in size of said number in said first counter to within the storage capacity of said second counter for transferring a representation of the number in said first counter to said second counter.

18. In a data processing system, the combination comprising: first and second counters for storing numbers, said first counter having a predetermined storage capacity and said second counter having a storage capacity which is less than that of said first counter, means for inserting data representing a number in said first counter, means for successively decreasing the size of said number in said first counter, transfer means responsive to the decrease in size of said number in said first counter to within the storage capacity of said second counter for transferring a representation of the complement of the number in said first counter to said second counter, and means for successively altering the value of said number in said second counter until it reaches a predetermined value.

References Cited

UNITED STATES PATENTS 3,059,222 10/1962 Demmer ---------- 340—172.5

GARETH D. SHAW, Primary Examiner

P. L. BERGER, Assistant Examiner